(12) United States Patent
Pang

(10) Patent No.: US 12,061,511 B2
(45) Date of Patent: *Aug. 13, 2024

(54) LOW-LATENCY LOW-POWER CONSUMPTION PERIPHERAL DEVICE FOR CONFERENCING

(71) Applicants: GUANGZHOU SHIYUAN ELECTRONICS CO., LTD., Guangdong (CN); GUANGZHOU SHIRUI ELECTRONICS CO. LTD., Guangdong (CN)

(72) Inventor: Yuanyang Pang, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/129,959

(22) Filed: Apr. 3, 2023

(65) Prior Publication Data

US 2023/0236650 A1 Jul. 27, 2023

Related U.S. Application Data

(63) Continuation of application No. 17/092,053, filed on Nov. 6, 2020, now Pat. No. 11,644,883.

(30) Foreign Application Priority Data

Nov. 8, 2019 (CN) .......................... 201921922693.4
Nov. 8, 2019 (CN) .......................... 201921922694.9
May 29, 2020 (CN) .......................... 202010479265.X

(51) Int. Cl.
*G06F 1/3231* (2019.01)
*G06F 1/26* (2006.01)
(Continued)

(52) U.S. Cl.
CPC ............ *G06F 1/3231* (2013.01); *G06F 1/263* (2013.01); *G06F 1/266* (2013.01);
(Continued)

(58) Field of Classification Search
CPC . H04N 7/15; H04W 4/80; G06F 1/263; G06F 1/266; G06F 1/3206;
(Continued)

(56) References Cited

U.S. PATENT DOCUMENTS 10,482,440 B1 11/2019 White et al.
10,922,041 B2 2/2021 Liu
(Continued)

FOREIGN PATENT DOCUMENTS

CN 102982653 A 3/2013
CN 104394600 A 3/2015
(Continued)

OTHER PUBLICATIONS

Chinese Application No. 202011043529.3, First Office Action mailed Aug. 25, 2021, 29 pages.
(Continued)

*Primary Examiner* — Thomas J. Cleary
(74) *Attorney, Agent, or Firm* — Zhong Law, LLC

(57) ABSTRACT

A communication device includes an interface connector for connecting to a computing circuit to receive a media data and an external power supply, a transmission circuit, wherein the circuit transmits the media data to a network, a battery power supply, a controller circuit powered by the battery power supply, a sensor, communicatively coupled to the controller circuit, for detecting a movement of the communication device, a switch circuit for switchably connecting the battery power supply to the transmission circuit responsive to a first switch control signal, and a test circuit, communicatively coupled to the controller circuit, for generating the first switch control signal based on an external power control signal indicating whether the interface connector is connected to the computing circuit and a motion
(Continued)

detection signal indicating whether the sensor detects the movement of the communication device.

20 Claims, 13 Drawing Sheets

(51) Int. Cl.
| | |
|---|---|
| *G06F 13/42* | (2006.01) |
| *G06F 3/14* | (2006.01) |
| *G09G 3/20* | (2006.01) |
| *H04L 12/10* | (2006.01) |
| *H04N 7/15* | (2006.01) |

(52) U.S. Cl.
CPC ........ *G06F 13/4282* (2013.01); *G06F 3/1454* (2013.01); *G06F 2213/0016* (2013.01); *G06F 2213/0042* (2013.01); *G09G 3/2092* (2013.01); *G09G 2330/021* (2013.01); *G09G 2370/16* (2013.01); *H04L 12/10* (2013.01); *H04N 7/15* (2013.01)

(58) Field of Classification Search
CPC ............. G06F 3/04144; G06F 3/04883; G06F 3/1454; G06F 13/12; G06F 13/122; G06F 13/4282; G06F 21/34; G06F 21/35; G06F 2213/0016; G06F 2213/0042; G06F 2213/3814
See application file for complete search history.

(56) References Cited

U.S. PATENT DOCUMENTS

| | | | |
|---|---|---|---|
| 11,205,397 B2 | 12/2021 | Mu | |
| 11,262,968 B2 | 3/2022 | Tian | |
| 11,644,883 B2 * | 5/2023 | Pang | ........................ G06F 1/263 |
| | | | 709/204 |
| 2004/0134281 A1 | 7/2004 | Pedrazzini et al. | |
| 2004/0150934 A1 | 8/2004 | Baarman | |
| 2009/0143104 A1 | 6/2009 | Loh et al. | |
| 2012/0077435 A1 | 3/2012 | Blanton et al. | |
| 2014/0001264 A1 | 1/2014 | Babu et al. | |
| 2014/0154994 A1 | 6/2014 | Mason et al. | |
| 2016/0085538 A1 | 3/2016 | Finch | |
| 2017/0235535 A1 | 8/2017 | Shen | |
| 2017/0287347 A1 | 10/2017 | Liau et al. | |
| 2017/0289145 A1 | 10/2017 | Boesen | |
| 2019/0250728 A1 | 8/2019 | Macdonald et al. | |
| 2020/0168347 A1 | 5/2020 | Tolliver et al. | |
| 2020/0272404 A1 | 8/2020 | Mu | |
| 2022/0116237 A1 | 4/2022 | Pang | |

FOREIGN PATENT DOCUMENTS

| | | | |
|---|---|---|---|
| CN | 105799735 | A | 7/2016 |
| CN | 106028261 | A | 10/2016 |
| CN | 206281565 | U | 6/2017 |
| CN | 107135472 | A | 9/2017 |
| CN | 108340803 | A | 7/2018 |
| CN | 108829227 | A | 11/2018 |
| CN | 208421800 | U | 1/2019 |
| CN | 109348167 | A | 2/2019 |
| CN | 109683928 | A | 4/2019 |
| CN | 209118258 | U | 7/2019 |
| CN | 111641431 | A | 9/2020 |

OTHER PUBLICATIONS

Chinese Application No. 202011043529.3, Second Office Action mailed Feb. 18, 2022, 28 pages.
International Application No. PCT/CN2020/139260, International Search Report and Written Opinion mailed Mar. 24, 2021, 13 pages.
International Application No. PCT/CN2020/139613, International Search Report and Written Opinion mailed Jul. 2, 2021, 8 pages.
Huang et al., "Basics of Power Switches," Application Report SLVA927A, Apr. 2019, Texas Instruments Incorporated.

* cited by examiner

LOW-LATENCY LOW-POWER CONSUMPTION PERIPHERAL DEVICE FOR CONFERENCING

CROSS-REFERENCE TO RELATED APPLICATIONS

This application is a continuation of U.S. application Ser. No. 17/092,053 filed Nov. 6, 2020, which claims priority to China Patent Application No. 202010479265.X filed May 29, 2020, China Patent Application No. 201921922694.9 filed Nov. 8, 2019, and China Patent Application 201921922693.4 filed Nov. 8, 2019. The contents of above-mentioned applications are incorporated by reference herein in their entirety.

TECHNICAL FIELD

This disclosure relates to an intelligent conference system, and in particular to a low-latency low-power consumption peripheral device for intelligence conferencing.

BACKGROUND

Existing technologies provide various solutions that can help participants of a conference communicate with each other. Exemplary solutions can include projecting the presentation content onto a big screen to share with the audience, communicating via remote instant communication, and displaying on a large-format display device (e.g., a large-format touch screen) that allows writing and drawing thereon. The large-format display device refers to devices that include a screen with the diagonal dimension larger than a certain length (e.g., larger than 32 inches). One more approach is to use wireless screen transmitter to transmit the screen image of a personal computer (PC) onto the large-format touch screen.

BRIEF DESCRIPTION OF THE DRAWINGS

The present disclosure is illustrated by way of example, and not by way of limitation, in the figures of the accompanying drawings.

DETAILED DESCRIPTION

Figure 1:
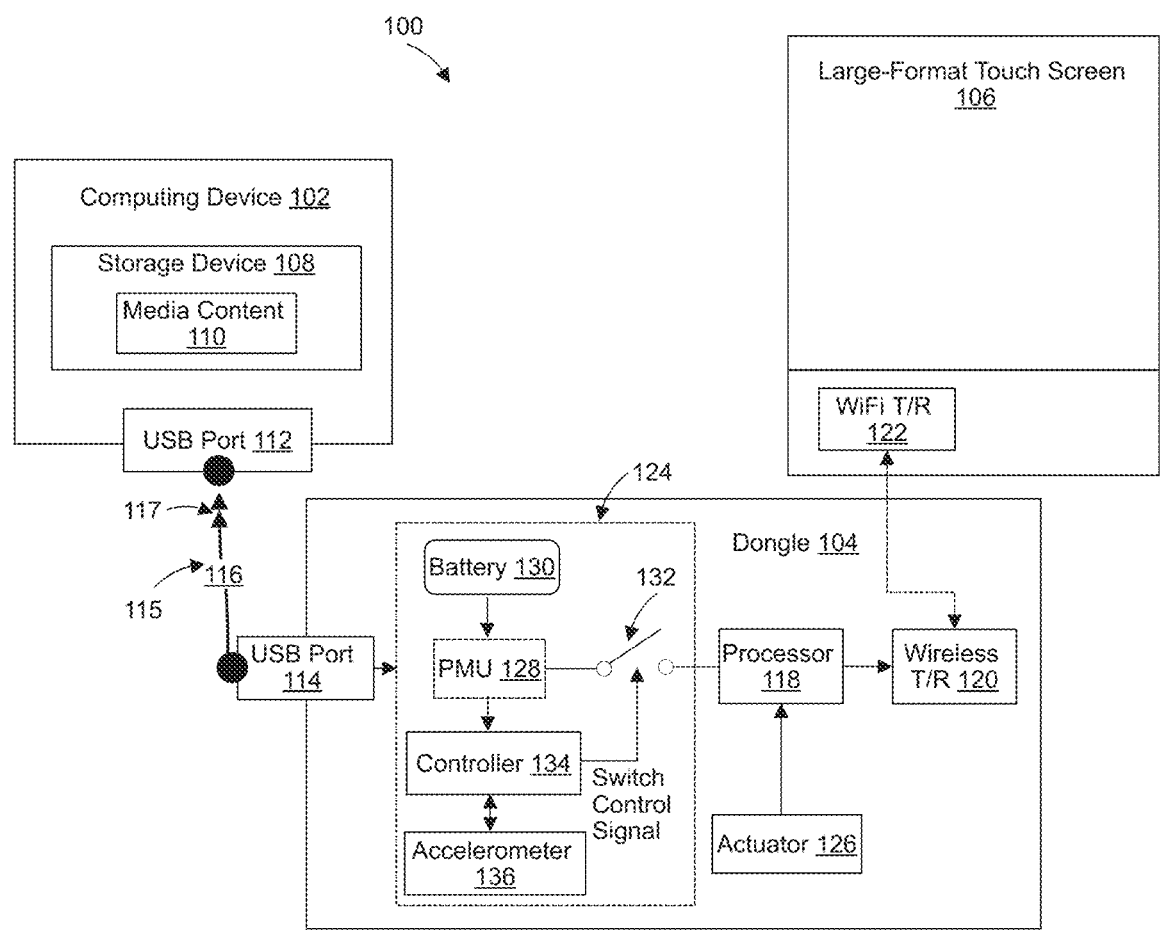
FIG. 1 illustrates a conferencing system for transmitting media content from a computing device onto a large-format touch screen using a peripheral device 104 according to an implementation of the present disclosure.

A conference presenter may use certain software application (e.g., a media player) running on a computing device (e.g., a personal computer, a tablet, or a smart phone) to play a media content (e.g., images, video). To share with other participants of the conference, the presenter may connect the computing device to a wireless network (e.g., a WiFi network) to which the large-format display device may have access. The large-format display device may include a processor that can download the media content and present the media content on a screen. To eliminate efforts by the presenter to configure the network setting the computing device, some implementations may provide a peripheral device (also referred to as a dongle) in the conference room for the guest presenters to use, where the peripheral device may include a pre-configured network interface that allows the data transmission between the computing device and the network.

In some implementations, the peripheral device may include a storage device and a wireless transceiver, where the storage device may contain the wireless network transmission program. Further, the peripheral device may include a USB connection cable with a USB connector that may be plugged into the computing device. When the peripheral device is connected to the computing device, the computing device may load and execute the wireless network transmission program from the storage device. When executed by the processor of the computing device, the wireless network transmission program may perform transmitting the media content in an appropriate format to the storage of the peripheral device, and further transmitting the media content through the wireless transceiver to the wireless network to be accessed by the large-format display device. Since the wireless transceiver is pre-configured by the wireless network transmission program, the presenter can connect to the large-format display device through the wireless network without configuring the network setting of the computing device. In other implementations, to further improve the efficiency, the peripheral device may also include a processor that may execute programs to convert the media data into formats that are suitable for wireless transmission.

The peripheral device as a stand-alone device often does not contain an electrical power source. Instead, the peripheral device receives the electrical power through the USB connection when it is connected to the computing device. The process to power on the peripheral device, however, may require a significant time delay typically in the range of 10 to 20 seconds. During the power-on process, the computing device is not ready to be connected to the large-format display device, thereby resulting in a less satisfactory user experience. In some implementations, the peripheral device may contain a battery power source that may keep the processor in the peripheral device in an ON state so that the peripheral device is always in a ready state. These implementations, however, may drain the battery in a short period of time (e.g., less than 24 hours), thus requiring frequent recharges of the peripheral device. This is also not ideal because the dongle often stays in a conference room (e.g., over a weekend) without being used or plugged into a charger.

Implementations of the disclosure provide technical solutions that overcome the above-identified and other deficiencies of the current conferencing solutions for transmitting screen images from a user computing device (e.g., a personal computer, a tablet, or a smart phone) to a large-format display device (e.g., a large-format touch screen). The peripheral device according to the implementations may run under a low-power battery state in which the device may detect a user intention to use the device and responsive to detecting the user intention, switch the device to an operational-power battery state under which the peripheral device is initialized before it is plugged into the computing device, thus achieving low-latency start while maintaining a low-power consumption by the peripheral device.

One implementation of the disclosure provides a sensor and a power management unit in the peripheral device, where the sensor may anticipatorily detect a user intention to use the peripheral device based on device movement, and the power management unit may switch the peripheral device from the low-power battery state (referred to as a sleep state) to the operational-power battery state responsive to detecting the user intention and prior to user plug-in of the peripheral device into the computing device. Under low-power battery state, a low-power consumption circuit logic (e.g., a microcontroller unit (MCU)) may be powered on by the battery to monitor an output signal of the sensor, where the output signal may indicate whether the sensor has detected a user action intended to use the peripheral device. Responsive to the output signal indicating the detection of the user action by the sensor, the MCU may control a switch circuit to the engaged state to supply a power to a processor (e.g., a system-on-chip (SoC) device) and other components connected to the processor. The peripheral device may then run under the operational-power battery state when the processor is powered on. Under the operational-power battery state, the SoC may initiate the start-up process even before the peripheral device is plugged into the computing device to receive data. Thus, the peripheral device may be already in a working state when the peripheral device is finally plugged into the computing device, thereby significantly reducing the overall battery power consumption by the peripheral device and the delay time between the plug-in of the peripheral device and the screen transmission from the computing device to the large-format display device.

In one implementation, the peripheral device may include an interface connector for connecting to a computing device to receive a media data and an external power supply, a processor for causing transmission of the media content to a network, a battery power supply, a controller circuit powered by the battery power supply, a sensor, communicatively coupled to the controller circuit, for detecting a movement of the communication device, and a switch circuit switchably connecting the battery power supply to the processor based on a switch control signal generated by the control circuit responsive to detecting the movement.

FIG. 1 illustrates a conferencing system 100 for transmitting media content from a computing device 102 onto a large-format touch screen 106 using a peripheral device 104 according to an implementation of the present disclosure. As shown in FIG. 1, conferencing system 100 may include a computing device 102, a peripheral device (also referred to as a dongle) 104, and a large-format touch screen 106. Computing device 102 can be a suitable personal computing device of a user. Examples of computing device 102 may include personal computers or mobile devices such as smart phones. A user may bring his/her computing device 102 to a conference or a classroom for the purpose to present media content 110 onto large-format touch screen 106. In one implementation, computing device 102 may include a screen (not shown), a hardware processor (not shown), a storage device 108 for storing media content 110, and a USB port 112 (e.g., a USB-C type port) for connecting to a peripheral device such as, for example, a monitor or a dongle. The hardware processor may execute an operating system that manages operations of computing device 102 and provides drivers to communicate with peripheral devices. Storage device 108 can be a flash memory device, a hard disk, or a network storage accessible by computing device 102. Media content 110 can be a PowerPoint™ presentation (a PPT file), a video clip, or a stack of slices in the portable document format (pdf). The hardware processor may run an application program (e.g., Microsoft PowerPoint) that may convert the media contents into image data stored in an image buffer suitable to be displayed on the screen of the computing device 102.

Computing device 102 may also include a port for connection with peripheral devices. In one implementation, the port can be a universal serial bus (USB) Type-C (referred to as USB-C) port 112 for connecting to peripheral devices that support the USB-C specification. The USB can be USB 2.0, USB 3.0 or any USB standard that supports Type-C specification. The USB-C port 112 may include 24 physical pins specified according to the USB-C protocol.

USB-C port may include 24 pins, including two parallel lines of rotationally-symmetrical pins, where the first line may include 12 pins identified as pins A1-A12, and the second line may include 12 pins identified as B1-B12 to support bi-directional plug-in. The pins may include ground return GND (A1, A12, B12, B1), first SuperSpeed differential pair TX+/TX− (A2/A3, B11/B10), bus power $V_{BUS}$ (A4, A9, B9, B4), configuration channel CC1, CC2 (A5, B5), USB 2.0 differential pair Dp1, Dn1 (A6/A7, B7/B6), secondary bus SBU (A8, B8), and second SuperSpeed differential pair RX−/RX+(A10/A11, B3/B2).

In some versions of USB-C may support different modes including a DisplayPort (DP) mode. The DisplayPort mode is a digital display interface standard set by Video Electronics Standards Association (VESA). The DisplayPort mode primarily supports the connection between the USB-C port and a display device. Under the DisplayPort mode, the USB-C interface can transmit video/audio, USB control data, and other forms of data to the display device. In the context of this disclosure, the video source may come from the image data in the video frame buffer of computing device 102. The video frame buffer is a type of memory that stores the images to be presented on a screen of or connected to computing device 102. Peripheral device 104 may present itself as though it is a display device to computing device 102. In the DisplayPort mode, the USB-C port may rely on packetized data (referred to as packet data or packets) transmission where small data packets containing a small chunk of the media content data are transmitted from a source to a destination. The clock signal used to synchronize the media content data is embedded in the packet data stream. In the DisplayPort mode, the USB-C port interface may employ the one or two differential pairs (A2/A3, A10/A11, or B11/B10, B3/B2) to transmit DP video/audio data packets. In one implementation, a peripheral device (e.g., peripheral device 104) may use the configuration channel pin CC1, CC2 (A5, B5) to transmit a control signal to computing device 102. The control signal may set the one or two differential pairs to operate in the DisplayPort mode to transmit the video/audio data packets, thus enabling the peripheral device to communicate with computing device 102 using the video/audio drivers already installed on computing device 102 (e.g., already installed with the operating system as part of pre-installed software). The video/audio data carried by the DisplayPort data packets are not compressed and thus are ready for display without decoding. In this way, the one or two differential pairs of the USB-C port may be used to transmit screen data of computing device 102.

The bus power $V_{BUS}$ pin (A4, A9, B9, B4) may provide power supply from computing device 102 to the peripheral device 104. Thus, computing device 102 may supply an external power using the $V_{BUS}$ pin to peripheral device when peripheral device 104 is plugged into computing device 102. USB 2.0 differential pair Dp1, Dn1 (A6/A7, B7/B6) can be used to transmit other types of data information such as to transmit the touch gesture data captured by the large-format touch screen 106 as described in this disclosure.

Peripheral device 104 may include an interface connector 115 that further includes a USB connector 117 and a cable 116. The cable 116 may include a wire fixedly connected to a USB port 114 which can be a USB-C type port, and USB connector 117 can be plugged into USB port 112 of computing device 102. Thus, when the USB connector 117 is plugged into USB port 112, peripheral device 104 may receive media data corresponding to media content 110 and an external power supply from computing device 102. The media data may include images or audio data.

In one implementation, USB-C port 114 may include a USB-C connector including board to board connectors matched to the pins of USB-C port 112 of computing device 102. When the USB-C connector 117 is plugged into USB-C port 112, the cable may connect USB-C port 112 of computing device 102 with USB-C port 114 for providing a wired data communication link. Through the two (or four) differential pairs of data channels and bus power pins, computing device 102 may transmit DisplayPort data packets and the power signal from computing device 102 to peripheral device 104. Further, through the configuration control and USB 2.0 differential pairs, peripheral device 104 may transmit control signals generated by hardware processor 118 and touch gesture data captured by large-format touch screen 106 to computing device 102. Peripheral device 104 may use control signals to request computing device 102 to set USB-C port 112 to run under the DisplayPort mode.

Peripheral device 104 may further include a power management subsystem 124, a hardware processor 118, and wireless transmitter/receiver 120 (e.g., a WiFi transmitter/receiver), and optionally, a physical actuator 126.

Peripheral device 104 may include a signal converter (not shown) to convert the received media data to a video stream and an audio stream in formats that are suitable for processor 118 further processing. The media data may contain packets of uncompressed raw video/audio data. For example, the video data can include raster images of pixels, each pixel being represented by its luminance (Y) and chrominances (U, V) values. The audio data can include the audio data in the pulse-code modulation (PCM) format. The clock signal may be embedded in the stream of packet data. Both the video and audio data can be in the uncompressed formats.

The signal converter may extract the raw video data from media data packets and reformat the raw video data into a video stream in a video format, and extract the raw audio data from the media data packets and reformat the raw audio data into an audio stream in an audio format, where the video format and the audio format may be designed for interfacing video/audio data between a computing device and a peripheral device so that the processor 118 of the peripheral device may further process the media data. In one implementation, signal converter may reformat the raw video data into a Mobil Industry Processor Interface (MIPI) video format, and reformat the raw audio data into an Inter-IC Sound ($I^2S$) audio format.

Signal converter may further output the video stream and the audio stream to processor 118, where processor 118 may include encoder circuit to encode and compress the video stream and the audio stream for transmission over a wireless network to large-format touch screen 106. In one implementation, processor 118 can be a system-on-chip (SoC) such as a central processing unit (CPU) based on a reduced instruction set computer (RISC) architecture developed by Advanced RISC Machines (referred to as an ARM processor). The ARM processor may include image signal processing (ISP) pins to receive the video stream and the audio stream from signal converter. Responsive to receiving the video stream and the audio stream, processor 118 may execute encoders to perform video compression and audio compression. In one implementation, processor 118 may perform H.264/H.265 video compression to generate a compressed video stream and to perform the audio compression (e.g., based on OPUS or MP3) to generate a compressed audio stream that is synchronized to the video stream through the clock signal. Both the compressed video stream and the compressed audio stream are much smaller than the corresponding video stream and audio stream prior to compression. Thus, the compressed video stream and the compressed audio stream are suitable for transmission over a wireless network which may have a limited bandwidth for data transmission.

Wireless transmitter/receiver 120 can be a wireless communication interface to receive the compressed video stream and the compressed audio stream, and transmit the compressed video stream and the compressed audio stream over a wireless network. In one implementation, wireless transmitter/receiver 120 may include logic circuit to package the compressed video stream and the compressed audio stream into data packets and transmit the data packets over a WiFi communication network to large-format touch screen 106.

Large-format touch screen 106 may include a screen (e.g., a LED screen) to display the media content 110, where the display may mirror the screen display of computing device 102. In one implementation, in addition to the touch screen, large-format touch screen may include, or be associated with, a wireless transmitter/receiver 122 and a processor (not shown). Wireless transmitter/receiver 122 may receive, over the wireless network, data packets transmitted by wireless transmitter/receiver 120 of peripheral device 104. Further, wireless transmitter/receiver 122 may unpack the data packet to reconstruct the compressed video stream and the compressed audio stream. The processor of the large-format touch screen 106 may include decoder circuit to restore the uncompressed video stream from the compressed video stream, and to restore the uncompressed audio stream from the compressed audio stream. The processor may further cause the video stream and the audio stream to be presented on the touch screen. Thus, implementations of the disclosure provide a technical solution that allows the transmission of media content 110 available on computing device 102 onto large-format touch screen 106. In this way, the user of computing device 102 may be spared from the inconvenience and safety concerns of installing the special-purpose program. Further, the transmission of media content 110 to large-format touch screen 106 does not consume resources of computing device 102, thus reducing the computing burdens of computing device 102.

In one implementation, peripheral device 104 may further include an actuator 126 that controls when to start transmission of media content 110 to large-format touch screen 106. Actuator 126 can be a physical input device such as, for example, a push button that is connected to a switch device. Responsive to receiving an indication of activating the actuator 126 (e.g., pressing down the push button), peripheral device 104 may start to transmit the compressed video and audio data to large-format touch screen 106.

In some implementations, the peripheral device relies upon computing device 102 to provide the power supply. Under these implementations, the peripheral device is powered on only when the USB connector 117 is plugged into USB port 112 of computing device 102. When peripheral device is powered on, processor 118 may first undergo an initialization process that may include booting up processor 118, loading an operating system kernel for processor 118, and loading the drivers for USB port 114. Further, to prepare the peripheral device for transmission of the media data, processor 118 may also load the driver for the wireless transceiver 120 to cause the wireless transmission interface connecting to a hotspot of the wireless network, and responsive to establish connection to the hotspot, establishing a communication channel between the wireless transmission interface and the hotspot. In one implementation, the wireless network is a WiFi network. To establish the communication channel, processor 118 may identify the pre-set Service Set Identifier (SSID) of the WiFi network and connect to a WiFi hotspot of the WiFi network using pre-set passcode. Processor 118 may also need to set up the USB connection with computing device 102, which may include load an image file to allow both transmission of the media data and the external power supply, configure a storage of the peripheral device as a USB mass storage to receive the media data from computing device 102, and identify the communication device as a USB device to the computing device. The performance of all these steps to set up the peripheral device ready for transmission data from computing device 102 to large-format touch screen 106 may cause a noticeable delay, typically more than 10 seconds, resulting less than ideal user experience. In some other implementations, the peripheral device may include a battery power source to keep processor 118 powered on in a ready state. Processor 118 typically includes sophisticated circuitry that may consume a significant power while it is on. In these implementations, the battery 130 may drain quickly even if the peripheral device is not in use.

To address these technical problems and other deficiencies, implementations of the disclosure provide a power management subsystem 124 that may run at a low-power battery state for detecting a movement of peripheral device 104 prior to plugging USB connector 117 into USB port 112, where the movement may indicate a user intention to use peripheral device. Under the low-power battery state, the battery 130 does not supply power to processor 118, thus significantly reducing the power drain from the battery 130 and increasing the time between recharges of the battery 130. Responsive to detecting the movement, power management subsystem 124 may switch to an operational-power battery state under which the battery 130 is switchably connected to processor 118 to start the initialization process still prior to USB connector 117 being plugged into USB port 112. When USB connector 117 is plugged into USB port 112 of computing device 102, power management subsystem 124 may switch processor 118 to the external power supply received from computing device 102 and switch off the power supply from the battery 130. Further, power management subsystem 124 may charge the battery 130. Because processor 118 is already initialized or partially initialized during the operational-power battery state, the time delay between the plug-in of the USB connector 117 and when the peripheral device 104 is ready for transmission of media data can be eliminated or significantly reduced, thus enhancing the user experience.

Referring to FIG. 1, in one implementation, power management subsystem 124 may include a battery 130, a controller 134, an accelerometer 136 serving as a motion sensor, a switch circuit 132, and optionally, a power management unit 128. Battery 130 can be an internal battery pack enclosed in the casing of peripheral device 104 or an external battery pack connected to the circuits of peripheral device 104 through a power connector. Both the internal and external battery packs in this disclosure are collectively referred to as the battery power source 130 which is independent from the computing device 102. In one implementation, the battery power source 130 can be one or more rechargeable lithium batteries that may be recharged by another power source such as the external power supply from computing device 102.

Power management subsystem 124 may include a switch 132 that, based on a switch control signal, switchably connects battery power source 130 to processor 118. In an initial low-power battery state under which peripheral device 104 is idle (not being used), switch 132 is disengaged and the battery power source 130 does not supply electric power to processor 118. In this state, processor 118 is in a powered-off state with no power consumption. The engagement of switch 132 is controlled by the switch control signal generated by controller 134 responsive to an activation of accelerometer 136 caused by a movement of the peripheral device 104.

Accelerometer 136 situated in the peripheral device may detect movement of the peripheral device 104. In an application scenario, the peripheral device 104 is a mobile device commonly made available in a conference room for a presenter to use. The presenter can be located in any place in a room (e.g., a conference room or a classroom). Because the cable 116 is typically about 6 inches long, peripheral device 104 needs to be moved closer to computing device 102 before being plugged into it. Thus, the movement of peripheral device 104 may indicate a user intention to use the peripheral device 104 that may be used as a trigger to power up processor 118.

An accelerometer 136 is a motion sensor that measures proper acceleration which can be a single- or multi-axis acceleration. Accelerometer 136 may detect both the magnitude and direction of the proper acceleration as a vector quantity that may sense, but not limited to, orientation/coordinate acceleration, vibration, and shock to the peripheral device 104. These movements may indicate a user intention to use the peripheral device 104 for transmitting media content 110 from computing device 102 to large-format touch screen 106.

Controller 134 can be a microcontroller as part of a microcontroller unit (MCU) circuit which is an integrated circuit chip that may receive sensor data from accelerometer 136 and generate signals for controlling switch circuit 132. Controller 134 may be designed to handle a limited number of tasks, just running at very low power consumption compared to processor 118 which usually is a fully functional SoC. In one implementation, controller 134 may be selected to be an MCU consuming power at the μA level.

The controller 134 may monitor the sensor data output from accelerometer 136 in the low-power battery state. Because the controller 134 consumes power at the μA level, peripheral device 104 may maintain the low-power battery state for a long time (e.g., 72 hours) without requiring a recharge to battery 130.

Figure 2:
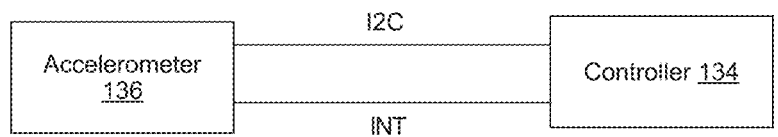
FIG. 2 illustrates the inter chip communication between a microcontroller and an accelerometer according to an implementation of the disclosure.

Referring to FIG. 2, controller 134 may be coupled to accelerometer 136 through an inter IC communication interface (I2C, Inter-Integrated Circuit) for transferring data and control signal between the two devices. Additionally, accelerometer 136 may be coupled to controller 134 through an interrupt mechanism that will raise an interrupt signal to controller 134. Controller 134 may use the I2C interface to initialize the settings of accelerometer 136 and to set up the event that generates the interrupt signal. In one implementation, controller 134 may read the real-time sensor data such as the proper accelerations along the positive and negative directions of three axes (i.e., total 6 directions), and determine whether the sensor data indicate a movement of peripheral device 104 based on a rule. For example, controller 134 may determine that peripheral device 104 is moved if the proper acceleration value in any one of the six directions exceeds a threshold value (e.g., 350 mg). Responsive to the determination, controller 134 may generate the control signal to control switch circuit 132 to close (or engage) connecting battery power source 130 to processor 118 and supplying power to processor 118. In this implementation, controller 134 may need to constantly monitor the sensor data and make a determination based on the sensor data. Because controller 134 is constantly monitoring the sensor data on I2C and accelerometer 136 is constantly providing sensor data to the I2C, controller 134 and accelerometer 136 may be in an enhanced power consumption state.

To further reduce the power consumption, in one implementation, controller 134 may configure, at initiation through the I2C interface, accelerometer 136 to generate an interrupt signal directed at the controller 134 if the proper acceleration value in any one of the six directions exceeds a threshold value (e.g., 350 mg). During operation, controller 134 may be in an idle state (e.g., low-power battery state) that can be wake up by an interrupt signal, where the idle state consumes less power than the operation state. When the event that the proper acceleration value in any one of the six directions exceeds the threshold value, accelerometer 136 may generate the interrupt signal to wake up controller 134 which may in turn generate the control signal to engage switch 132 to provide power from battery power source 130 to processor 118, causing processor 118 to start the initialization of peripheral device 104.

In one implementation, battery power source 130 may include rechargeable lithium batteries that can be recharged when USB connector 117 is plugged into computing device 102. Power management subsystem 124 may further include a power management unit 128 that may manage the charge and discharge of battery power source 130. Further, power management subsystem 124 may include circuitries that may detect the event that USB connector 117 is plugged into computing device 102 and the event that USB connector 117 is unplugged from computing device 102, and based on these events, cause switch circuit 132 to engage or disengage.

Figure 3:
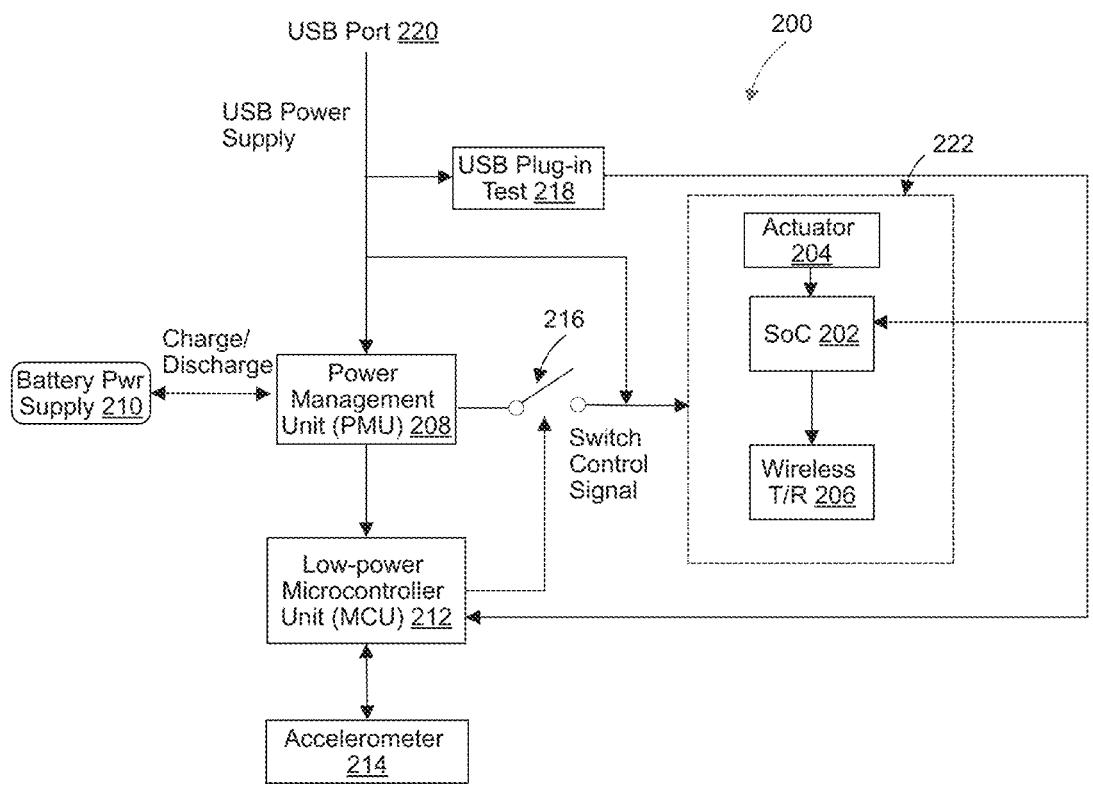
FIG. 3 illustrates a peripheral device according to an implementation of the disclosure.
Figure 5A:
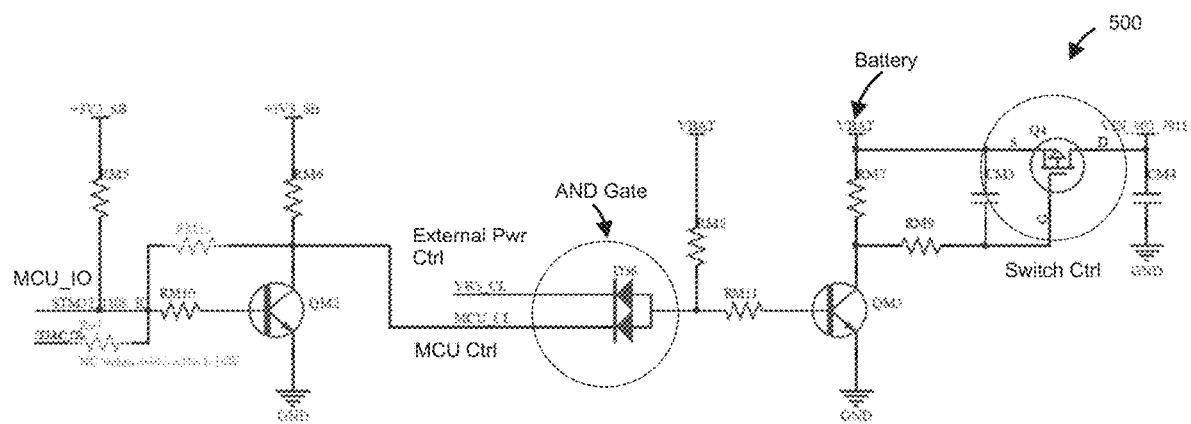
FIGS. 5A-5C illustrate a control circuit according to an implementation of the disclosure.
Figure 5B:
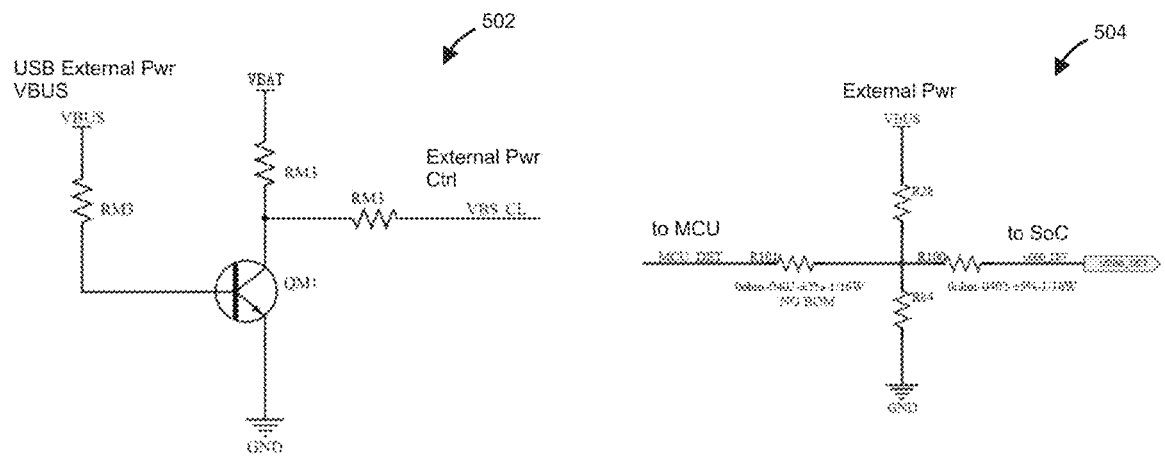
Figure 5C:
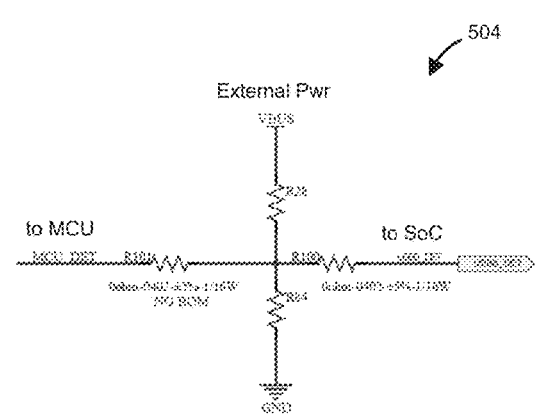

FIG. 3 illustrates a peripheral device 200 according to an implementation of the disclosure. Similar to FIG. 1, peripheral device 200 may include a transmission subsystem 222 including a SoC 202 implementing a processor, actuator 204, and a wireless transceiver (transmitting/receiving) 206, which are commonly provided in a dongle implementation. Peripheral device 200 may further include a power management subsystem including a power management unit (PMU) 208, a battery power source 210, a microcontroller unit (MCU) 212, an accelerometer 214, a switch circuit 216, and a USB plug-in test circuit 218. The MCU 212 may include a microcontroller (e.g., controller 134) and control circuit associated with the microcontroller, where the control circuit may include circuit logics such as an AND logic (e.g., circuit logics as shown in FIGS. 5A-5C). Peripheral device 200 may include a USB port 220 coupled to a USB cable and USB connector (not shown) for connecting to a computing device. As discussed in conjunction with FIGS. 1 and 2, under the low-power battery state (e.g., peripheral device 200 sits on a table in a conference room before being used by plugging into a computing device), switch circuit 216 is disengaged, and transmission subsystem 222 is not connected with battery power source 210. MCU 212 and accelerometer 214, however, are connected to battery power source 210 through PMU 208, and are operating in the low-power battery state. In this state, accelerator 214 may detect the proper acceleration value in any one of six acceleration directions on three axes exceeds a threshold value (e.g., 350 mg), and generate an interrupt signal to MCU 212.

When MCU 212 (or the controller therein) is in the idle state, it may be waked up by the interrupt signal. Responsive to receiving the interrupt signal from accelerometer 214, MCU 212 may generate a motion detection signal which may be used to generate a switch control signal provided to a control pin of switch circuit 216. The switch control signal may control switch circuit 216 to engage or close, allowing battery power source 210 to supply power from an input pin to an output pin of the switch circuit, thereby supplying the power to transmission subsystem 222 and causing a transition from the low-power battery state to the operational-power battery state. Responsive to receiving electric power from battery power source, transmission subsystem 222 may start the boot-up process of SoC 202, making wireless transceiver 206 ready to receive media data from the computing device when the USB connector is coupled to the computing device. In the operational-power battery state, electric power is discharged from battery power source 210 through PMU 208 to transmission subsystem 222.

While transmission subsystem 222 is being booted up, a user may plug the USB connector of peripheral device 200 into the computing device. Through the USB connector and the USB cable, the computing device may supply an external power to peripheral device 200, which may cause the circuit configuration of peripheral device 200 to switch to the external power source from the computing device. USB plug-in test circuit 218 may be coupled to an input pin of MCU 212 and generate a voltage signal (also referred to as an external power control signal) for MCU 212 indicating whether the USB connector is plugged into the computing device. Responsive to plugging the USB connector into the computing device, USB plug-in test circuit 218 may generate an external power control signal (as shown in FIG. 5B) for MCU 212. The external power control signal when indicating the USB plug-in may further generate a switch control signal that may cause disengagement of switch circuit 216, thereby disconnecting battery power source 210 from transmission subsystem 222. In some situations, even if the peripheral device 200 is moved, the movement may be accidental—that is, the movement of the peripheral device 200 is not followed by a user action to plug the USB connector into the computing device. To prevent this type of false triggering, MCU 212 may include a timer that may be set to a certain period of time (e.g., 60 seconds) of wait time. If the user does not plug in the USB connector within the period of time after receiving an interrupt signal from accelerometer 214, MCU 212 may determine that the detected movement is a false alarm. MCU 212 may generate a switch control signal to disengage switch circuit 216 and return to the low-power battery state.

The external power supply from the computing device when connected directly supplies to the transmission subsystem 222 to maintain its operation. USB plug-in test circuit 218 may also supply the external power control signal through a voltage divider circuit (as shown in FIG. 5C) to the controller in MCU 212 and to SoC 202 to notify the controller and SoC 202 the coupling and uncoupling with the computing device. Responsive to receiving the external power control signal indicating the uncoupling of the computing device, SoC 202 may issue an instruction to stop transmitting media data to the large-format screen device.

Figure 4:
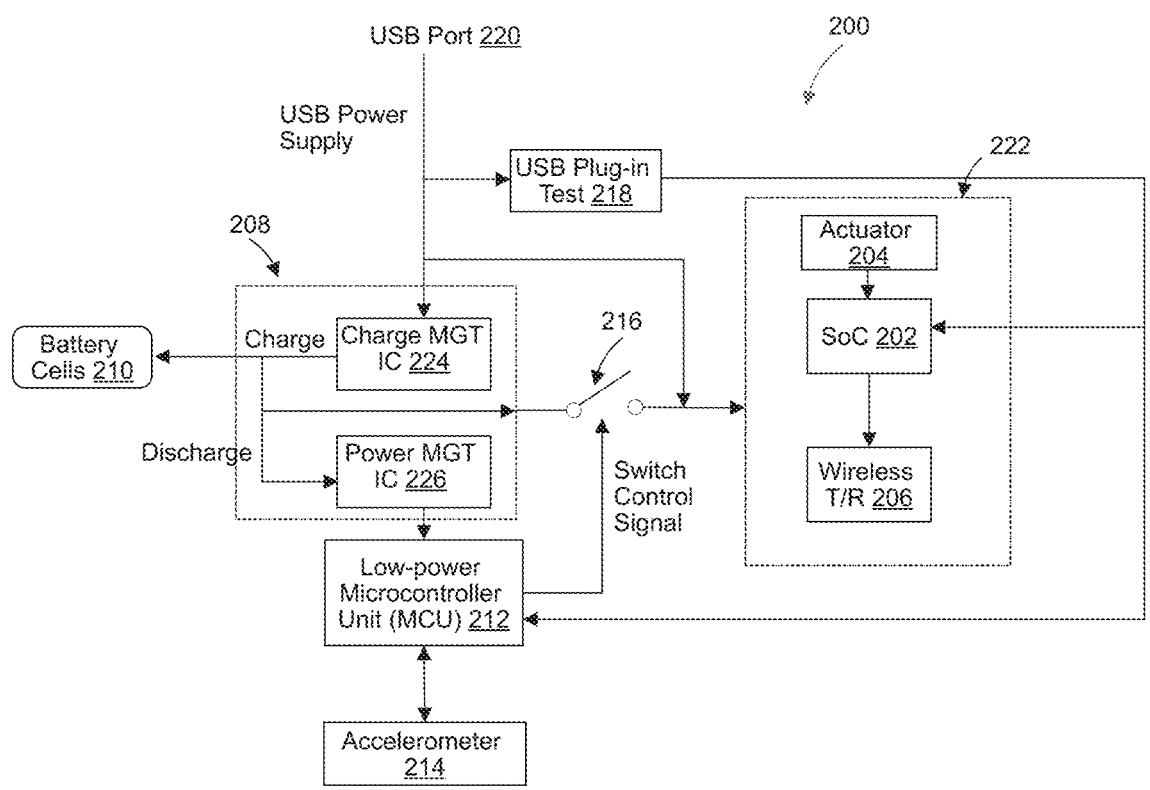
FIG. 4 illustrates the peripheral device with a power management unit according to an implementation of the disclosure.

PMU 208 may include integrated circuits (ICs) that manage the charge and discharge of battery power source 210. FIG. 4 illustrates the peripheral device 200 with a power management unit 208 according to an implementation of the disclosure. As shown in FIG. 4, PMU 208 may include a charge management IC 224 and a power management IC 226. Charge management IC 224 may include power regulation circuit that receive external power supply from USB port 220 when the USB connector is plugged into the computing device and generate a charge current to a rechargeable battery power source 210 (e.g., a rechargeable lithium battery pack). Power management IC 226 may receive a discharge current and regulate the discharge current to provide a working voltage to MCU 212 and accelerometer 214. In one implementation, power management IC 226 may include a buck regulator circuit (or DC-to-DC converter (DCDC)) or a low dropout regulator (LDO) circuit.

While peripheral device 200 is powered by external power source supplied by the computing device, MCU 212 may continuously receive sensor data and/or the interrupt signal from accelerometer 214 monitoring the movement of peripheral device 200. To ensure that power to transmission subsystem 222 is not cut off and a next user may continue to use peripheral device 200 without a restart of the transmission subsystem 222, switch circuit 216 may be controlled according to the switch control signal generated based on an external power control VBS_CL indicating the external power supply and a MCU control signal indicating the motion detection. When the peripheral device 200 is plugged into the computing device and powered by the external power supply from the computing device, the external power control signal may generate the switch control signal to force the switch circuit 216 to disengage. When the external power supply is cut off, MCU 212 may also generate a switch control signal that may cause switch circuit 216 to engage, thereby providing a power supply to transmission subsystem 222 to ensure continuous operation. In this way, the peripheral device 200 may be handed to a next user without requiring a power off and restart of transmission subsystem 222, thereby achieving a seamless transition from one user to another by maintaining the connection to the wireless network.

MCU 212 may set a timer to a certain period of time (e.g., 60 seconds) responsive to the engagement of switch circuit 216 caused by the switch control signal (e.g., generated in response to receiving an interrupt signal from the accelerometer 214). If USB plug-in test circuit 218 indicates that the user plug in the USB connector from the computing device within the set period of time (e.g., 60 seconds), the switch circuit 216 may be switched off. At the expiration of the timer, MCU 212 may generate another switch control signal to disengage switch circuit 216 if the USB connector is not plugged into the computing device.

Various circuits may be used to implement MCU control circuit connected to PMU 208 and USB plug-in test circuit 218. FIG. 5A illustrates a MCU control circuit 500 according to an implementation of the disclosure. The MCU control circuit 500 may be implemented as part of or in connection with MCU 212 as shown in FIG. 2. As shown in FIG. 5A, the MCU control circuit 500 may receive the control signal MCU_CL generated by the MCU and the external power control VBS_CL. The combination of the control signal MCU_CL (or the signal derived from MCU_CL) and the external power control VBS_CL (or the signal derived from MCU_CL) may determine the switch control signal that controls whether to engage or disengage the switch circuit. For example, as shown in FIG. 5A, MCU_CL and VBS_CL may be combined using an AND gate to generate the switch control signal that controls the switch circuit (Q4). As shown in FIG. 5A, the switch circuit (Q4) is closed or engaged when the control signal voltage level at the G pin of Q4 is low, and the switch circuit (Q4) is open or disengaged when the control signal voltage level at the G pin of Q4 is high. The USB plug-in test circuit may trigger the generation of the external power control VBS_CL which may be at voltage low when the external power supply is provided from the computing device (i.e., USB connector is plugged in). When external power control VBS_CL is at voltage low, the switch circuit is disengaged. When external power control VBS_CL is at voltage high, the voltage levels of MCU control signal MCU_CL may determine whether the switch circuit is engaged or disengaged, thus supplying current to the transmission subsystem or not. The MCU_IO signal is an output at an output pin of the MCU. The MCU_CL signal may be derived from MCU_IO and is inverse to the MCU_IO signal. Table 1 illustrates the relationships among MCU_IO voltage, MCU_CL voltage, VBS_CL voltage, and the switch circuit status.

TABLE 1

| MCU_IO Voltage | MCU_CL Voltage | VBS_CL Voltage | Switch Status |
| --- | --- | --- | --- |
| H (no motion detected) | L | H (no external power) | Disengaged (OFF) |
| L (motion detected) | H | H (no external power) | Engaged (ON) |
| H | L | L (external power) | Disengaged (OFF) |
| L | H | L (external power) | Disengaged (OFF) |

FIG. 5B illustrates a USB plug-in test circuit 502 according to an implementation of the disclosure. As shown in FIG. 5B, USB plug-in test circuit 502 may include a transistor QM1 including a base terminal couple to the USB port to receive external power source (Vbus) via a resistor, a collector terminal coupled to the battery source (Vbat) via a resistor and provides external power control signal via a resistor, and an emitter terminal coupled to the ground. When the USB is plugged in to receive external power and the voltage of the external power is applied to the base terminal, transistor QM1 is on and the external power control signal (VBS_CL) is low, indicating the presence of the external power and generating a switch control signal to disengage the switch. When the USB is not plugged in and there is no external power applied to the base terminal, transistor QM1 is off and the external power control signal (VBS_CL) is high. In this situation, the switch control signal is determined by the MCU_CL signal.

Implementation of the disclosure may also provide circuit to inform the controller in MCU 212 and Soc 202 when the USB is plugged into the external computing device to receive external power. FIG. 5C shows a voltage divider circuit 504 that may be used to provide voltage signals to the MCU 212 and SoC 202 indicating whether the USB connector is plugged into the external computing device. When it is plugged in, the computing device may provide a Vbus (e.g., 5V) external power supply. Voltage divider circuit 504 may, through the resistors R28, R100, R101, R84, provide voltage signals to MCU 212 at a first end and to SoC 202 at a second end. When the USB connector is plugged into the external computing device, voltage divider circuit 504 may supply high voltage signals to MCU 212 and SoC 202 to indicate the presence of the external power supply. When the USB connector is unplugged from the external computing device, voltage divider circuit 504 may supply low voltage signals to MCU 212 and SoC 202 to indicate the absence of the external power supply.

Figure 6:
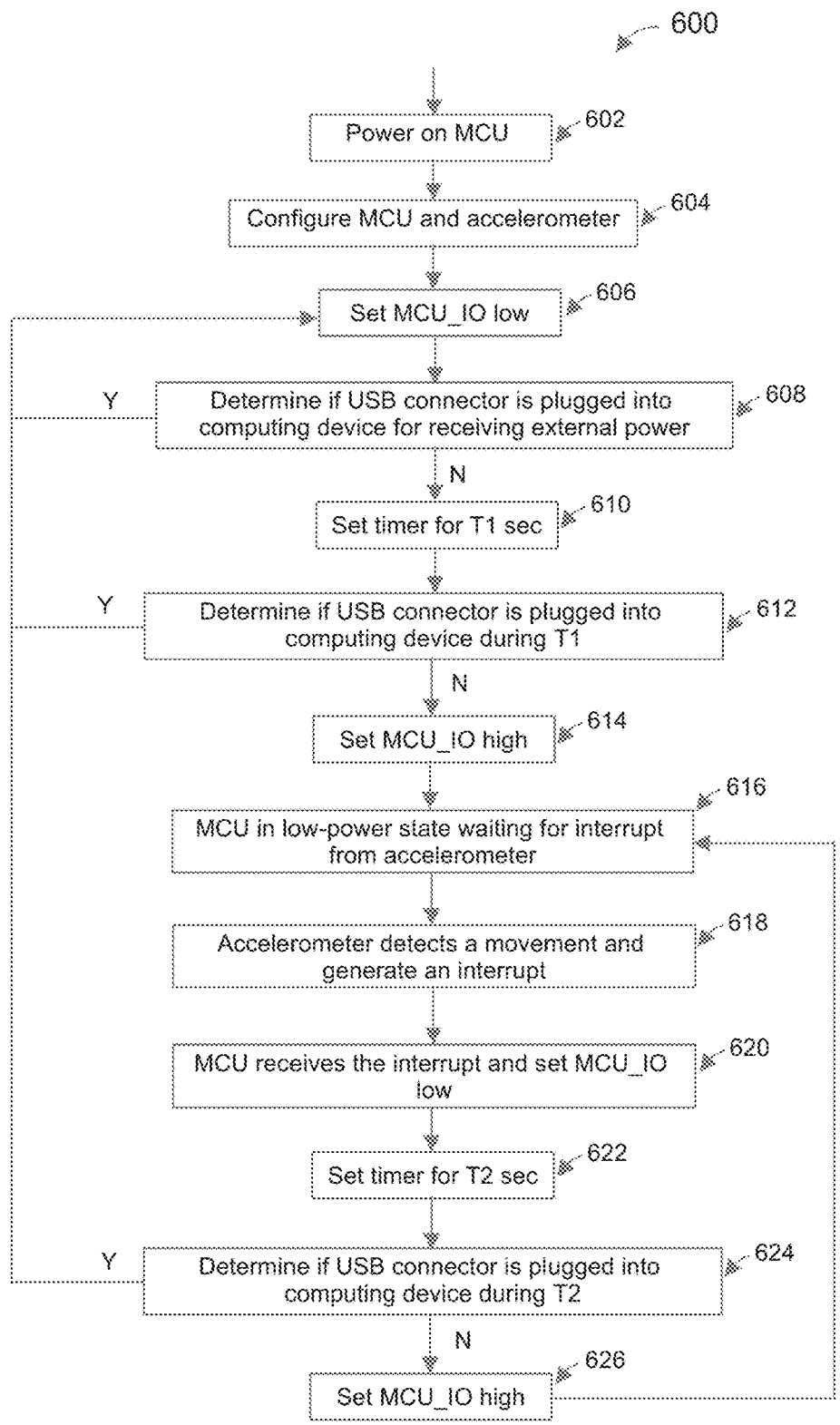
FIG. 6 is a flow diagram of a method to operate the MCU according to an implementation of the disclosure.

FIG. 6 is a flow diagram of a method 600 to operate the MCU according to an implementation of the disclosure. Referring to FIG. 6, at 602, the MCU may be powered on by the battery power source. Responsive to the power-on, at 604, MCU may initialize its internal registers for operation, and MCU may further configure the accelerometer. The configuration of the accelerometer may include setting the threshold value that may trigger the accelerometer to generate an interrupt signal. At 606, MCU may set an output signal MCU_IO to a low voltage (MCU_CL thus at a high voltage). At 608, the MCU may receive an external power control signal from USB plug-in test circuit indicating whether the USB connector is plugged into the computing device for receiving the external power supply. Responsive to determining that the USB connector is plugged into the computing device, the MCU may maintain MCU_IO at a low voltage while VBS_CL is at a low voltage, causing the switch circuit to be in the disengaged state. Responsive to determining that the USB connector is not plugged into the computing device, the USB plug-in test circuit may generate VBS_CL signal to be a high voltage, and at 610, the MCU noticed by the voltage divider circuit 504 may set a timer to T1 seconds (e.g., 60 seconds).

At 612, the USB plug-in test circuit may determine whether the USB connector is plugged into the computing device for receiving the external power supply within the set timer of T1 seconds. Responsive to determining that the USB connector is plugged into the computing device within the T1 seconds, the USB plug-in test circuit may set VBS_CL signal to a low voltage and the MCU may maintain MCU_IO at the low voltage, causing the switch circuit to be in the disengaged state. Responsive to determining that the USB connector is not plugged into the computing device within the T1 seconds, the USB plug-in test circuit may generate VBS_CL signal to be a high voltage, and at 614, the MCU may set MCU_IO to a high voltage (thus MCU_CL to a low voltage), causing the switch circuit to be in the disengaged state. At 616, the MCU may operate in the low-power battery state waiting for an interrupt signal from the accelerometer.

At 618, the accelerometer may detect a proper acceleration value exceeds the threshold value indicating a movement of the peripheral device or a user intention to use the device. Responsive to detecting the movement, accelerometer may generate an interrupt signal to the MCU. At 620, the MCU may receive the interrupt signal, and in response, set MCU_IO to a low voltage. To prevent false indication of using the peripheral device, at 622, the peripheral device may set the timer for T2 seconds (e.g., 60 seconds). At 624, the MCU may determine, based on a plug-signal from the USB plug-in test circuit, whether the USB connector is plugged into the computing device during T2 seconds. Responsive to determining that USB connector is plugged into the computing device during T2 seconds, the USB plug-in test circuit may set VBS_CL signal to a low voltage and the MCU may maintain the MCU_IO at the low voltage, causing the switch circuit to be in the disengaged state. Responsive to determining that USB connector is not plugged into the computing device during T2 seconds, at 626, the MCU may set MCU_IO to a high voltage and repeat step 616.

There are two operation scenarios for the peripheral device. In the first operation scenario, the peripheral device is plugged into the computing device and powered by the external power supply from the computing device. The MCU maintains MCU_IO at a low voltage to avoid the situation where the peripheral device is unplugged during the transmission of the media data to the wireless network, causing a power off to the transmission subsystem. Because the MCU_IO is at the low voltage and the VBS_CL is at the high voltage, the switch is engaged, thereby using the battery power source to maintain the operation of the transmission subsystem and achieving a seamless transition from one user to another. This may prevent the power-off of the transmission subsystem during the transition from one user to another.

In the second scenario, the peripheral device is not plugged into the computing device and powered by the battery power source. In this second scenario, to reduce the consumption of the battery power source, the MCU may generate a control signal to disengage the switch circuit after a period of time (e.g., 60 seconds) from the time point that the MCU receives an indication that the USB connector is unplugged. This may cause the power-off of the transmission subsystem to save the battery power source for a longer use time between charges. If within the period of time, the MCU receives an indication that the USB connector is plugged in again, indicating the start of a next user, the MCU may stop the timer and set and maintain MCU_IO to a low voltage to allow the continued power supply to the transmission subsystem until the external power is cut off.

Figure 7:
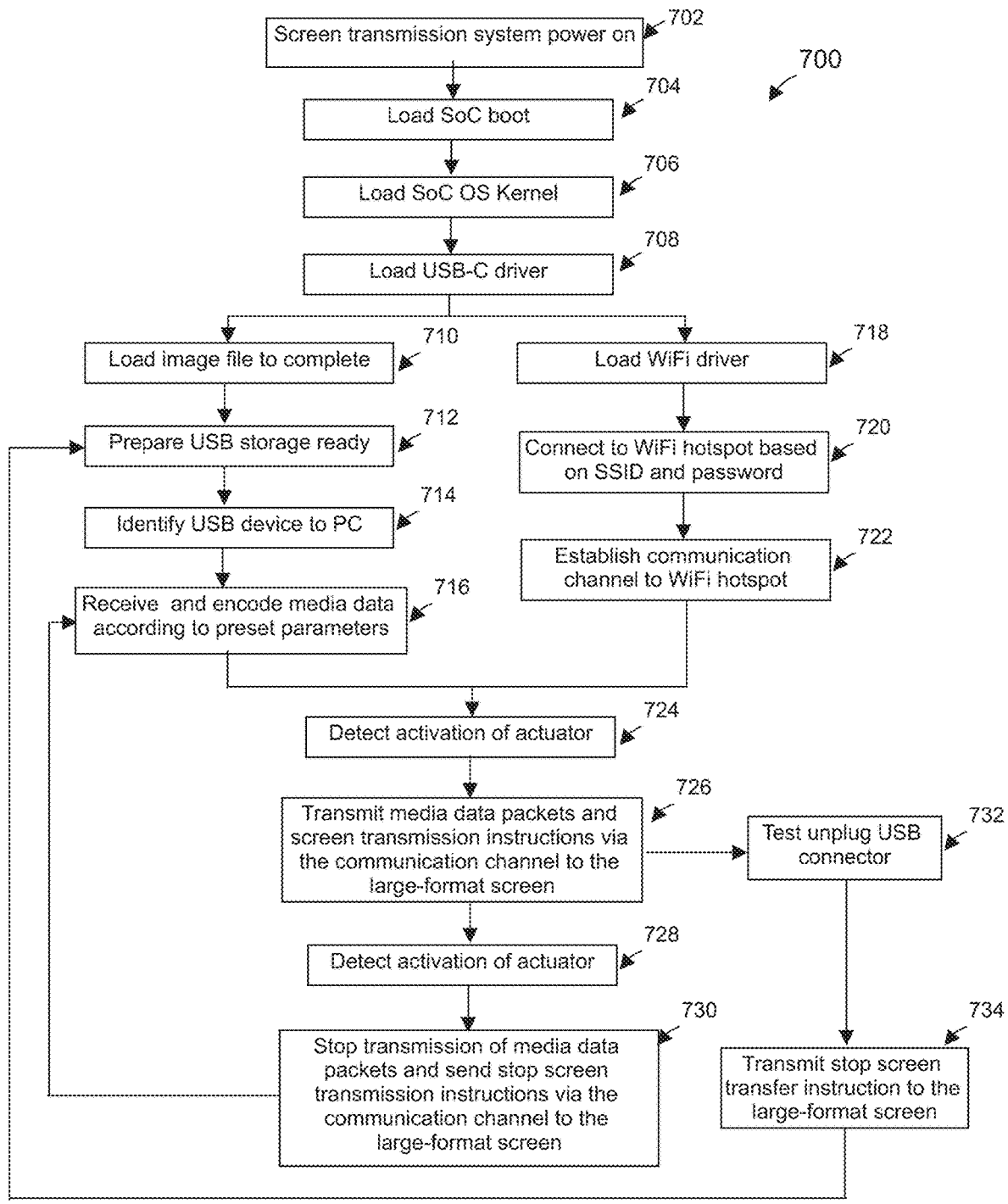
FIG. 7 is a flow diagram of a method to operate a system-on-chip (SoC) processor according to an implementation of the disclosure.

When the SoC is powered on by the battery power source, the SoC may perform initialization of the processor and hardware components in the peripheral device. Further, responsive to an activation of the actuator, SoC may further cause transmission of the media data to the wireless network and further to the large-format display device. FIG. 7 is a flow diagram of a method 700 to operate a system-on-chip (SoC) processor according to an implementation of the disclosure.

As shown in FIG. 7, at 702, the transmission subsystem may be powered on by the battery power source. At 704-708, the SoC in the transmission subsystem may perform at least one of loading boot instructions for an operating system (OS) kernel ported on the processor 704, loading the OS kernel 706, or loading driver programs for USB components 708. At 710-716, the SoC may further perform at least one of loading an image file to allow both transmission of the media data and the external power supply 710, configuring a storage as a USB mass storage to receive the media data 712, identifying the communication device as a USB device to the computing device 714, or receiving and encoding the media data received through the configured USB port according to a preset encoding scheme 716. At 718-722, the SoC may further perform loading driver programs for the wireless transceiver 718, connecting the wireless transceiver to a hotspot in a WiFi network based on an SSID and a password 720, or establishing a data communication channel from the wireless transceiver and the WiFi hotspot 722.

After the initialization process, the transmission subsystem is ready for transferring media data to the large-format display device. At 724, the SoC may detect an activation of the actuator on the peripheral device, indicating that the user intention to start transferring the screen from the computing device to the large-format display device. At 726, the SoC may issue instructions to start transmission of packets of media data and screen transfer instructions via the established communication channel to the WiFi network and further to the large-format display device. The media data may have been encoded in a suitable format by the SoC, and packetized by a wireless transmission interface. Two events may stop the screen transmission from the computing device to the large-format display device. At 728, the SoC may detect another activation of the actuator indicating that the user intention to stop the screen transmission. At 730, the SoC may issue instructions to stop the transmission of media data packets and send stop screen transfer instructions via the established communication channel to the WiFi network and further to the large-format display device. The transmission subsystem may return to step 716. Alternatively, at 732, the SoC may receive an unplug signal generated by the USB plug-in test circuit indicating that the USB connector is unplugged. In response, at 734, the SoC may transmit the stop screen transfer instruction to the large-format display device, causing the large-format display device to stop displaying media data packets, and the SoC may stop transmitting the media data to the large-format display device. This may have the advantage of a clean and quick stop of screen transfer, further improving the user experience. The ghost screen transfer is caused by the buffering of media data packets on the side of the large-format display device, which causes continued screen display on the large screen even if the user already unplugged the peripheral device from the computing device.

Figure 8A:
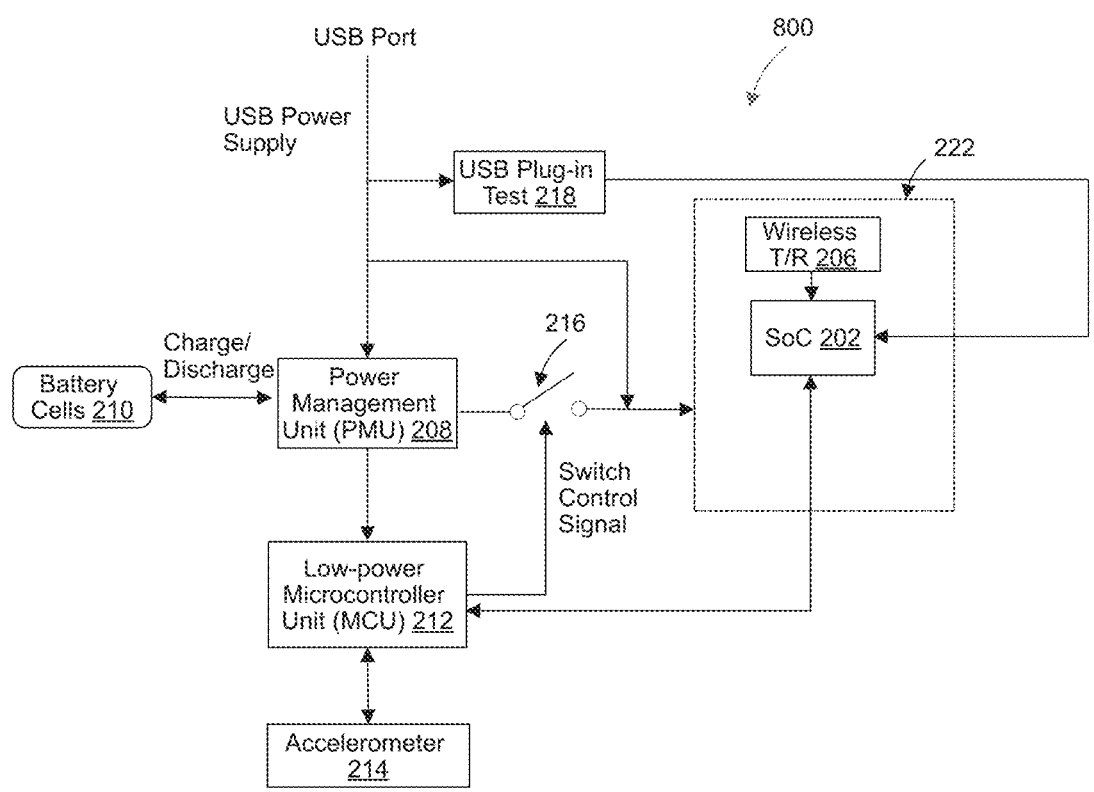
FIGS. 8A-8C illustrates the peripheral device according to various implementations of the disclosure.
Figure 8B:
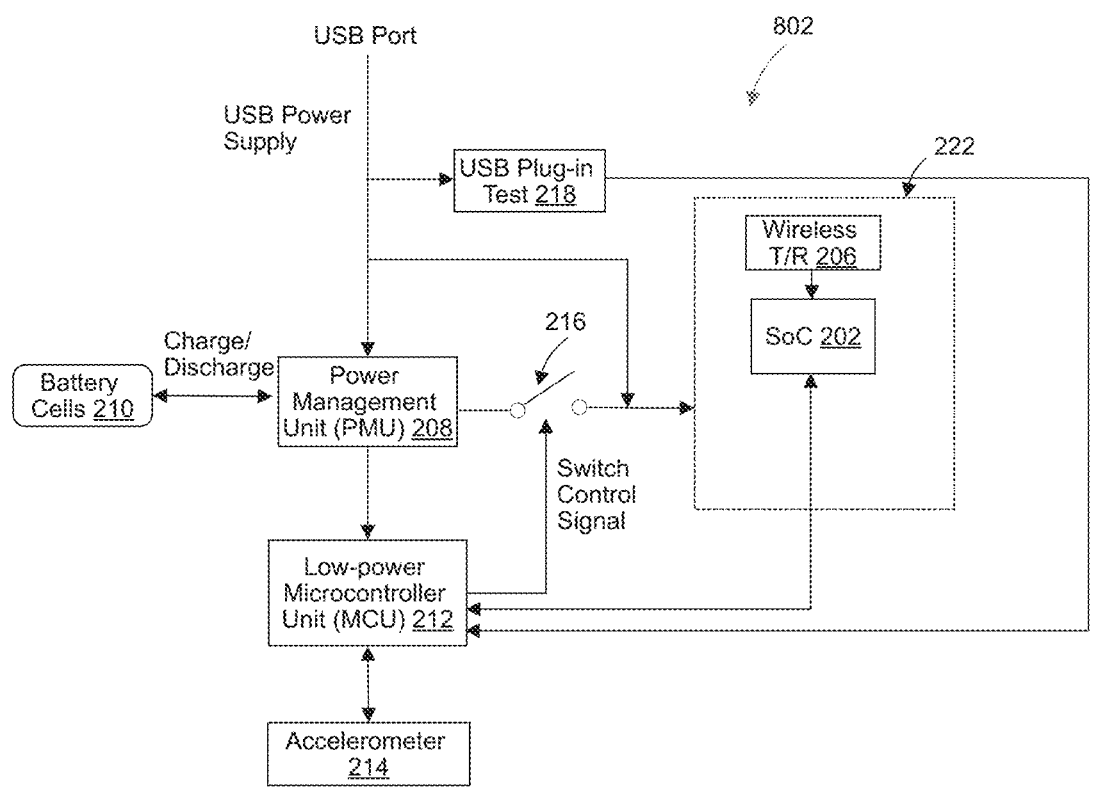
Figure 8C:
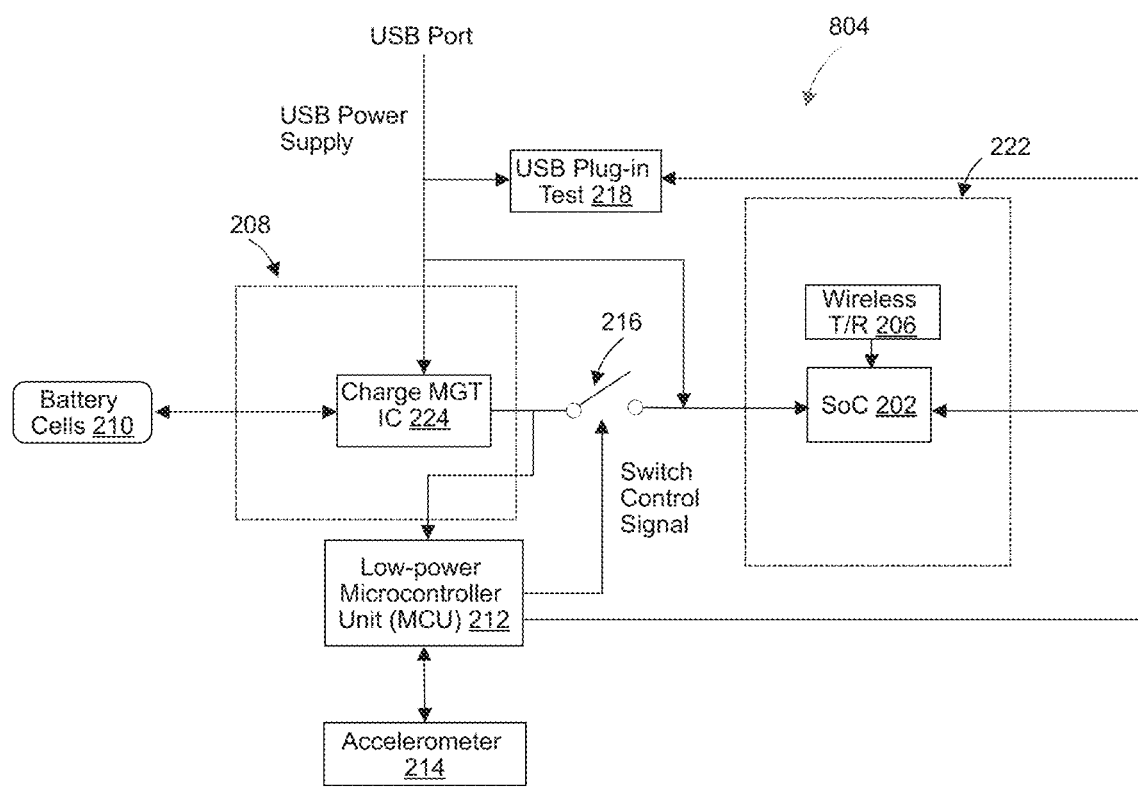

The peripheral device 200 as shown in FIG. 3 is one of many possible implementations. FIGS. 8A-8C illustrates the peripheral device according to various implementations of the disclosure. Compared to the peripheral device 200 as shown in FIG. 3, the peripheral device 800 as shown in FIG. 8A includes USB plug-in test circuit 218 that is coupled to MCU 212 indirectly through SoC 202. Thus, SoC 202 may first detect an external power control signal generated by the USB plug-in test circuit 218, and in response, forward the external power control signal to the MCU 212 using an inter-chip communication interface such as I2C (Inter-Integrated Circuit), UART (Universal Asynchronous Receiver/Transmitter), or GRIO (General-purpose input/output) etc. Thus, MCU 212 determine whether the USB connector is plugged in and the operation state of SoC 202 using the inter-chip communication interface. This implementation may have advantages when MCU 212 is implemented as a component on SoC 202, and the MCU 212 receives outside signals through pins of SoC 202.

In another implementation as shown in FIG. 8B, the USB plug-in test circuit 218 is coupled to MCU 212 but not to SoC 202. MCU 212 is coupled to SoC 202 through an inter-chip communication interface. Thus, MCU 212 may detect the plug-in/unplug signal generated by USB plug-in test circuit 218, and forward the signal to SoC using the inter-chip communication interface. For example, responsive to detecting an unplug signal generated by USB plug-in test circuit 218, MCU 212 may inform SoC 202 to generate the stop screen transfer instruction, thus achieving a quick stop of the screen transfer.

In another implementation, as shown in FIG. 8C, peripheral device 804 may include a PMU 208 that includes a charge management IC 224 but without the power management IC 226. In this implementation, charge management IC 224 may include a switch mechanism that may reconfigure the circuits in the charge management IC 224 when the power supply is switched between the battery power source 210 and the external power source. Thus, when the USB connector is plugged into the computing device to provide the external power supply, charge management IC 224 may receive the external power supply to charge the battery power source 210 at a first input/output pin and supply the power to the transmission subsystem at a second output pin. When the external power supply is not available, battery power source 210 may supply power from the first I/O pin to the second output pin (or using other pins) of charge management IC 224 to provide the power supply to MCU 212 for operating in the low-power battery state.

Figure 9:
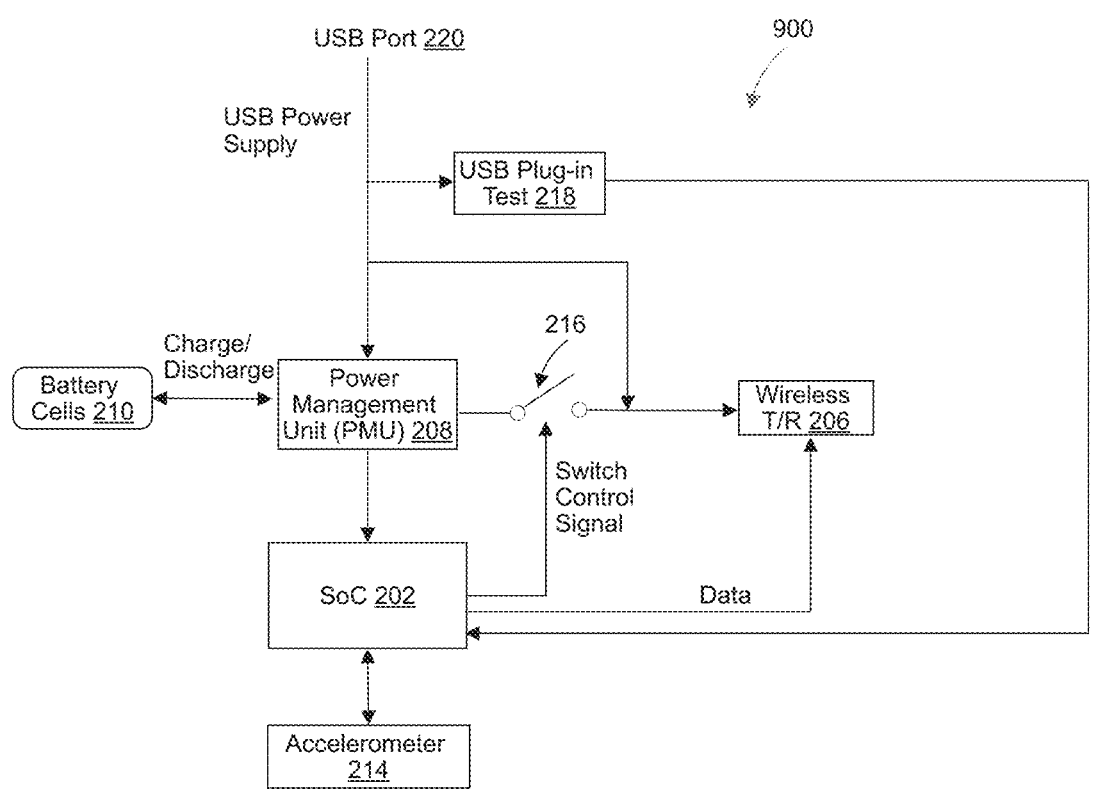
FIG. 9 illustrates a peripheral device according to another implementation of the disclosure.

In another implementation, the peripheral device may include an SoC that is directly coupled to the accelerometer to receive the sensor data and/or the interrupt signal, and eliminate the need for the MCU, thus saving components used in the system. FIG. 9 illustrates a peripheral device 900 according to another implementation of the disclosure. As shown in FIG. 9, SoC 202 is coupled to accelerometer 214 through an inter IC communication interface (I2C) and an interrupt mechanism. SoC 202 can be selected to be a low-power consumption chip with a power consumption below 1 mA, thus allowing a lithium battery pack with a capacity of 50-100 mAH to last up to 72 hours. Similar to the MCU, SoC may run at a lower-power battery state in which SoC 202 is idle and can be waked up by an interrupt signal generated by accelerometer 214. Under the low-power battery state, switch circuit 216 is disengaged and wireless transceiver is not connected with battery power source 210. Thus, battery power source 210 does not supply power to wireless transceiver, which may reduce the power consumption. SoC 202 and accelerometer 214, however, are connected to battery power source 210 through PMU 208, and are operating in the low-power battery state. In this state, accelerator 214 may detect the proper acceleration value in any one of six acceleration directions on three axes exceeds a threshold value (e.g., 350 mg), and generate an interrupt signal to SoC 202.

SoC 202 is in the idle state that may be waked up by the interrupt signal. Responsive to receiving the interrupt signal from accelerometer 214, SoC 202 may generate a switch control signal provided to a control pin of switch circuit 216. The switch control signal may control switch circuit 216 to engage or close, allowing battery power source 210 to supply power from an input pin to an output pin of the switch circuit, thereby supplying the power to wireless transceiver 206 and making wireless transceiver 206 ready to receive media data from the computing device when the USB connector is coupled to the computing device. In this operational-power battery state, electric power is discharged from battery power source 210 through PMU 208 to wireless transceiver 206.

While wireless transceiver 206 is ready for transmission, a user may plug the USB connector of peripheral device into the computing device. Through the USB connector and the USB cable, the computing device may supply an external power to peripheral device, which may cause the circuit configuration of peripheral device 900 to switch to the external power source from the computing device. USB plug-in test circuit 218 may be coupled to an input pin of SoC and generate a voltage signal for SoC 202 indicating whether the USB connector is plugged into the computing device. Responsive to plugging the USB connector into the computing device, USB plug-in test circuit 218 may generate an external power control signal to SoC 202 and cause SoC 202 to generate a switch control signal that may cause disengagement of switch circuit 216, thereby disconnecting battery power source 210 from wireless transceiver 206. In some situations, even if the peripheral device 900 is moved, the movement may be accidental—that is, the movement of the peripheral device 900 is not followed by a user action to plug the USB connector into the computing device. To prevent this type of false triggering, SoC 202 may include a timer that may be set to a certain period of time (e.g., 60 seconds). If the user does not plug in the USB connector within the period of time after receiving an interrupt signal from accelerometer 214, SoC 202 may determine that the detected movement is a false alarm. SoC 202 may generate a switch control signal to disengage switch circuit 216 and return to the low-power battery state after the period of time.

Figure 10:
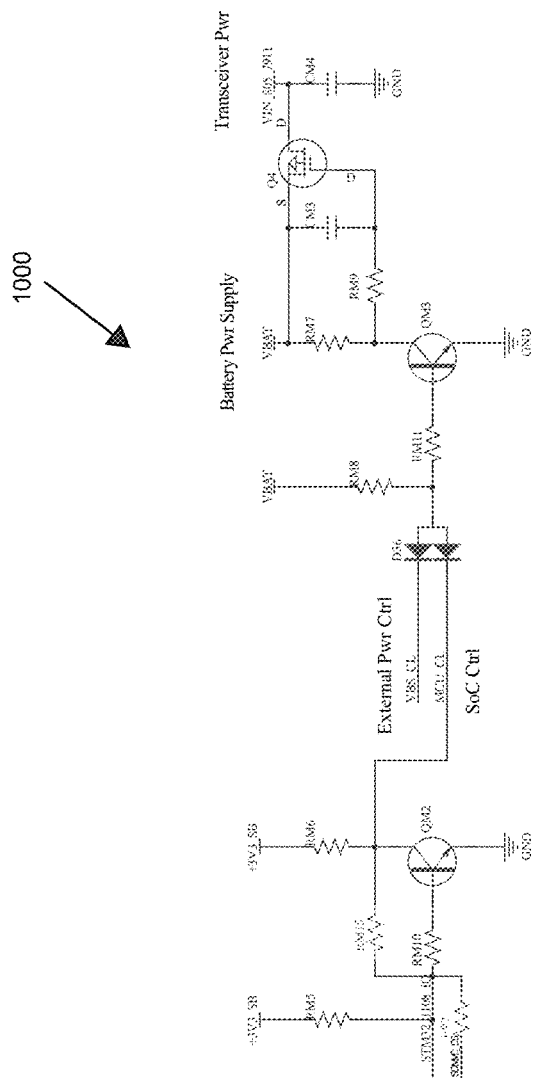
FIG. 10 illustrates a SoC control circuit according to an implementation of the disclosure.

Similar to the MCU control circuit, FIG. 10 illustrates a SoC control circuit 1000 according to an implementation of the disclosure. As shown in FIG. 10, the SoC control signal SoC_CL generated by the SoC may work with external power control VBS_CL to control whether to engage or disengage the switch circuit. For example, as shown in FIG. 10, SoC_CL and VBS_CL may be combined using an AND gate to generate the switch control signal that controls the switch circuit (Q4). The USB plug-in test circuit may trigger the generation of the external power control VBS_CL which may be at voltage low when the external power supply is provided from the computing device (i.e., USB connector is plugged in). When external power control VBS_CL is at voltage low, the switch circuit is disengaged. When external power control VBS_CL is at voltage high, the voltage levels of SoC control signal SoC_CL may determine whether the switch circuit is engaged or disengaged, thus supplying current from battery to the wireless transceiver or not. The SoC_IO signal is an output at an output pin of the SoC. The SoC control signal SoC_CL may be derived from SoC_IO, and SoC_CL is inverse to the SoC_IO signal. Table 2 illustrates the relationships among SoC_IO voltage, SoC_CL voltage, VBS_CL voltage, and the switch circuit status.

TABLE 2

| SoC_IO Voltage | SoC_CL Voltage | VBS_CL Voltage | Switch Status |
| --- | --- | --- | --- |
| H | L | H (no external power) | Disengaged (OFF) |
| L | H | H (no external power) | Engaged (ON) |
| H | L | L (external power) | Disengaged (OFF) |
| L | H | L (external power) | Disengaged (OFF) |

Figure 11:
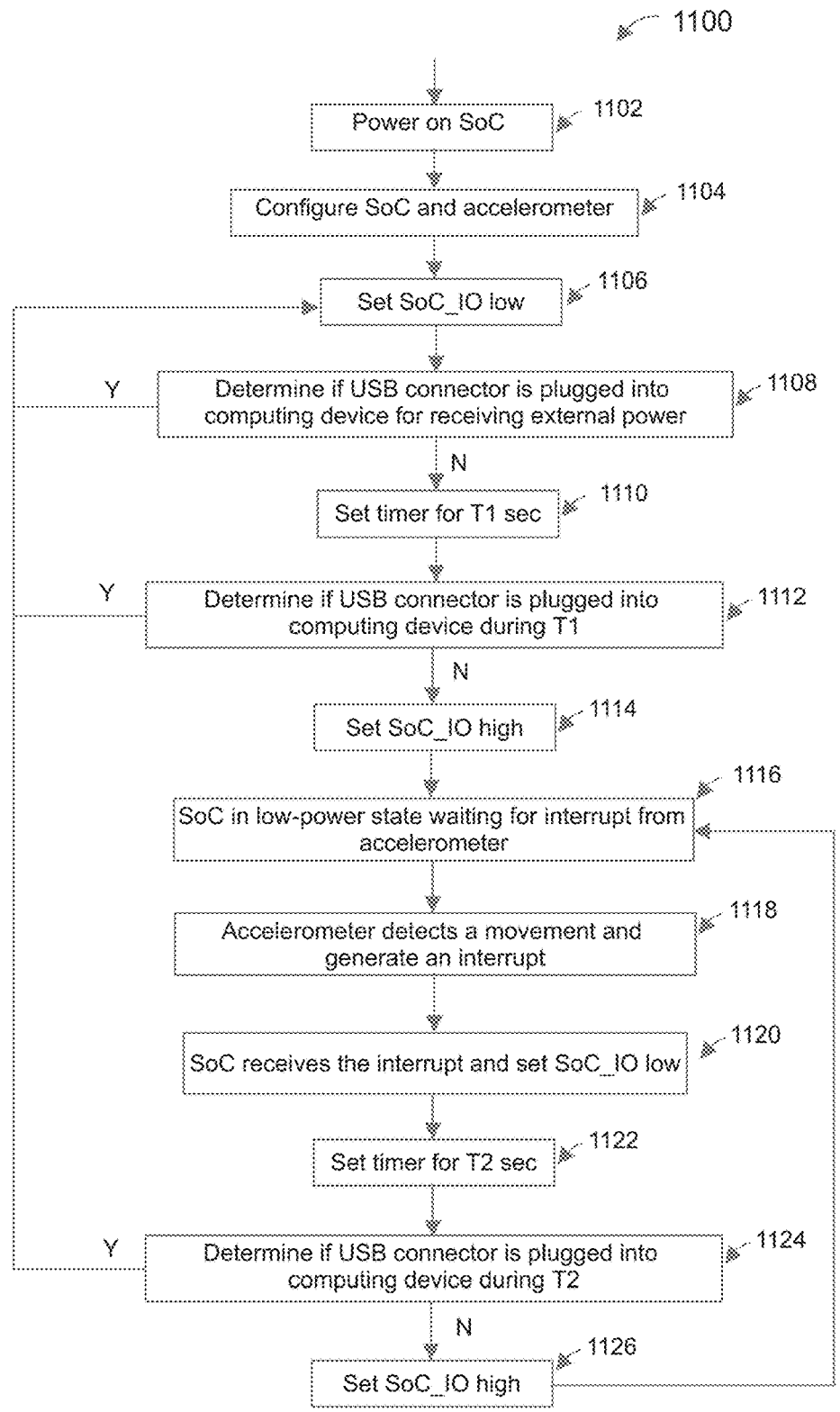
FIG. 11 is a flow diagram of a method to operate a SoC processor according to an implementation of the disclosure.

FIG. 11 is a flow diagram of a method 1100 to operate a SoC processor according to an implementation of the disclosure. Referring to FIG. 11, at 1102, the SoC may be powered on by the battery power source. Responsive to the power-on, at 1104, the SoC may boot up and load an operating system kernel for operation. The SoC may further configure the accelerometer. The configuration of the accelerometer may set the threshold value that may trigger the accelerometer to generate an interrupt signal. At 1106, SoC may set an output signal SoC_IO to a low voltage (SoC_CL thus at a high voltage). At 1108, the SoC may receive an external power control signal from USB plug-in test circuit indicating whether the USB connector is plugged into the computing device for receiving the external power supply. Responsive to determining that the USB connector is plugged into the computing device, the SoC may maintain SoC_IO at a low voltage while VBS_CL is at a low voltage, causing the switch circuit to be in the disengaged state. Responsive to determining that the USB connector is not plugged into the computing device, the USB plug-in test circuit may set VBS_CL signal to a high voltage, and at 1110, the MCU may set a timer to T1 seconds (e.g., 60 seconds) to avoid a false connection detection.

At 1112, the USB plug-in test circuit may again determine whether the USB connector is plugged into the computing device for receiving the external power supply during T1. Responsive to determining that the USB connector is plugged into the computing device, the VBS_CL signal is at a low voltage and the SoC may maintain SoC_IO at the low voltage, causing the switch circuit to be in the disengaged state. Responsive to determining that the USB connector is not plugged into the computing device within T1, VBS_CL signal is at a high voltage, and at 1114, the SoC may set SoC_IO to a high voltage (thus SoC_CL to a low voltage), causing the switch circuit to be in the disengaged state. At 1116, the SoC may operate in the low-power battery state waiting for an interrupt signal from the accelerometer.

At 1118, the accelerometer may detect a proper acceleration value exceeds the threshold value indicating a movement of the peripheral device or a user intention to use the device. Responsive to detecting the movement, accelerometer may generate an interrupt signal to the SoC. At 1120, the SoC may receive the interrupt signal, and in response, set SoC_IO to a low voltage. To prevent false indication of using the peripheral device, at 1122, the peripheral device may set the timer for T2 seconds (e.g., 60 seconds). At 1124, the SoC may determine, based on a plug-signal from the USB plug-in test circuit, whether the USB connector is plugged into the computing device during T2. Responsive to determining that USB connector is plugged into the computing device during T2, the USB plug-in test circuit may set VBS_CL signal to a low voltage and the SoC may maintain the SoC_IO at the low voltage, causing the switch circuit to be in the disengaged state. Responsive to determining that USB connector is not plugged into the computing device during T2, at 1126, the SoC may set SoC_IO to a high voltage and repeat step 1116.

There are two operation scenarios for the peripheral device. In the first operation scenario, the peripheral device is plugged into the computing device and powered by the external power supply from the computing device. The SoC may receive media data through the USB port, and encode the media data in an appropriate format. Responsive to detecting a first activation of the actuator, the SoC may cause the wireless transceiver to transmit the encoded media data in packets through the wireless network (e.g., a WiFi network) to the large-format display device. Responsive to receive a second activation of the actuator, the SoC may cause the wireless transceiver to stop the transmission of encoded media data to the large-format display device.

In the second scenario, the peripheral device is not plugged into the computing device and powered by the battery power source. In this scenario, the SoC operates according to the method 1100 as shown in FIG. 11.

Implementations of the disclosure provide for a communication device including an interface connector for connecting to a computing device to receive a media data and an external power supply, a transmission subsystem for transmitting the media data to a network, a battery power supply, a controller circuit powered by the battery power supply, a sensor, communicatively coupled to the controller circuit, for detecting a movement of the communication device, and a switch circuit for switchably connecting the battery power supply to the transmission subsystem responsive to a first switch control signal that is generated based on a motion detection signal generated by the controller circuit responsive to a detection of the movement by the sensor.

Implementations of the disclosure provide for a method for operating a peripheral device, where the peripheral device comprises a USB connector for connecting the peripheral device to a computing device to receive a media data and an external power supply, a transmission subsystem for transmitting the media data to a wireless network, a battery power supply, a microcontroller unit (MCU) powered by the battery power source, an accelerometer for detecting a movement of the peripheral device, and a switch circuit coupled between the battery power supply and the transmission subsystem. The method may include receiving, by the MCU, an interrupt signal generated by the accelerometer indicating a detection of a movement of the peripheral device, and generating, by the MCU based on the interrupt signal, a first switch control signal to cause the switch circuit to connect the battery power supply to the transmission subsystem to power on the transmission subsystem, and causing initialization of the transmission subsystem.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "transmitting", "receiving", "determining", "encoding", "packaging," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A communication device, comprising:
    an interface connector for connecting to a computing circuit to receive a media data and an external power supply;
    a transmission circuit, wherein the transmission circuit transmits the media data to a network;
    a battery power supply;
    a controller circuit powered by the battery power supply;
    a sensor, communicatively coupled to the controller circuit, for detecting a movement of the communication device;

a switch circuit for switchably connecting the battery power supply to the transmission circuit responsive to a first switch control signal; and a test circuit, communicatively coupled to the controller circuit, for generating an external power control signal, wherein the controller circuit is to generate the first switch control signal based on:

the external power control signal received from the test circuit, the external power control signal indicating whether the interface connector is connected to the computing circuit, and a motion detection signal indicating whether the sensor detects the movement of the communication device.

2. The communication device of claim 1, wherein the transmission circuit further comprises a processor and a wireless transceiver, wherein the processor is further to encode the media data according to an encoding scheme, and to cause the wireless transceiver to connect to the network using a wireless transmission interface, and wherein the wireless transceiver is further to transmit the encoded data to a second wireless transceiver through the network for presentation of the media data on a display screen.

3. The communication device of claim 2, wherein the interface connector is a universal serial bus (USB) connector, and wherein responsive to receiving the battery power supply, the processor is to perform at least one of:

loading boot instructions to an operating system kernel ported on the processor;

loading the operating system kernel; or loading a first driver for the USB connector.

4. The communication device of claim 3, wherein the USB connector comprises a cable and a physical connector, and wherein responsive to receiving the battery power supply, the processor is further to perform at least one of loading an image file for both transmission of the media data and the external power supply;

configuring a storage as a USB mass storage to receive the media data; or identifying the communication device as a USB device to the computing circuit.

5. The communication device of claim 4, wherein responsive to receiving the battery power supply, the processor is further to perform at least one of loading a second driver for the wireless transmission interface to cause the wireless transceiver connecting to a hotspot of the wireless network; or responsive to establishing connection to the hotspot, establishing a communication channel between the wireless transmission interface and the hotspot.

6. The communication device of claim 2, wherein the transmission circuit further comprises an actuator, and wherein the processor is to:

receive an indication of activating the actuator by a user; and cause the wireless transceiver through the wireless transmission interface to transmit the encoded media data to the wireless network.

7. The communication device of claim 1, wherein the communication device is a dongle for connecting the computing circuit through the network to the display screen, wherein the computing circuit is one of a personal computer, a tablet computer, or a smart phone, and wherein the display screen is a touch screen.

8. The communication device of claim 1, further comprising:

a power management circuit communicatively coupled to the interface connector, the controller circuit, and the battery power supply, wherein the power management circuit is to:

regulate a current supply from the battery power supply to the controller circuit; and responsive to detecting an external power control signal indicating a physical connection of the interface connector with the computing circuit, provide a charge current from the computing circuit to the battery power supply.

9. The communication device of claim 1, wherein the test circuit is to detect whether the interface connector is plugged into the computing circuit, wherein responsive to detecting a plug-in of the interface connector with the computing circuit, the test circuit is to generate an external power control signal indicating a physical connection, and responsive to detecting an unplug of the interface connector from the computing circuit, the test circuit is to generate the external power control signal indicating lack of the physical connection, and wherein the controller circuit further comprises a controller to generate the motion detection signal responsive to detecting the motion by the sensor, and an AND logic circuit having a first input pin to receive the external power control signal, a second input pin to receive the motion detection signal, and an output pin to provide the first switch control signal.

10. The communication device of claim 9, wherein the controller circuit is to set a timer to a pre-set time period responsive to the detection of the movement by the sensor, and wherein, responsive to failing to detect the external power control signal indicating the plug-in of the interface connector to the computing circuit within the pre-set time period, the controller circuit is to generate the first switch control signal to cause the switch circuit to engage and connect the battery power to the transmission circuit.

11. The communication device of claim 10, wherein, responsive to detecting the plug-in of the interface connector to the computing circuit within the pre-set time period, the test circuit is to generate the external power control signal indicating the physical connection and cause the switch circuit to disengage.

12. The communication device of claim 1, wherein the controller circuit comprises a controller, and the sensor comprises an accelerometer, and wherein the controller is to configure the accelerometer to generate an interrupt signal responsive to detecting a proper acceleration value equals to or exceeds a threshold value.

13. The communication device of claim 12, wherein responsive to receiving the interrupt signal generated by the accelerometer, the controller is to generate the motion detection signal to cause the switch circuit to connect the battery power to the transmission circuit.

14. A method for operating a peripheral device, wherein the peripheral device comprises a USB connector for connecting the peripheral device to a computing circuit to receive a media data and an external power supply, a transmission circuit, a battery power supply, a microcontroller unit (MCU) powered by the battery power supply, an accelerometer for detecting a movement of the peripheral device, a switch circuit coupled between the battery power supply and the transmission circuit, and a test circuit, communicatively coupled to the MCU, wherein responsive to detecting a plug-in of the interface connector with the computing circuit, the test circuit is to generate an external power control signal indicating a physical connection, and responsive to detecting an unplug of the interface connector from the computing circuit, the test circuit is to generate the external power control signal indicating lack of the physical connection, and wherein the transmission circuit transmits the media data to a wireless network, the method comprising:

receiving, by the MCU, an interrupt signal generated by the accelerometer indicating a detection of a movement of the peripheral device; and generating, by the MCU based on the interrupt signal and the external power control signal indicating the lack of the physical connection, a first switch control signal to cause the switch circuit to connect the battery power supply to the transmission circuit to power on the transmission circuit, and causing initialization of the transmission circuit.

15. The method of claim 14, wherein the transmission circuit further comprises a processor and a wireless transceiver, wherein the processor is further to encode the media data according to an encoding scheme, and cause the wireless transceiver to connect to the wireless network using a wireless transmission interface, wherein the wireless transceiver is further to transmit the encoded data to a second wireless transceiver through the wireless network for presentation of the media data on a display screen.

16. The method of claim 14, wherein the peripheral device is a dongle for connecting the computing circuit through the wireless network to the display screen, wherein the computing circuit is one of a personal computer, a tablet computer, or a smart phone, and wherein the display screen is a touch screen.

17. The method of claim 14, wherein the peripheral device further comprises a voltage divider circuit that, responsive to plugging the interface connector into the computing circuit, provides a first voltage signal to the MCU and a second voltage signal to the processor, wherein the first voltage signal and the second voltage signal both indicate the physical connection to the computing circuit, and that, responsive to unplugging the interface connector from the computing circuit, provides the first voltage signal to the MCU and the second voltage signal to the processor, wherein the first voltage signal and the second voltage signal both indicate lack of the physical connection to the computing circuit.

18. The method of claim 17, further comprising:
setting, by the MCU, a timer to a pre-set time period responsive to the detection of the movement by the accelerometer; and
responsive to failing to detect the external power control signal indicating the plug-in of the interface connector to the computing circuit within the pre-set time period, generating, by the MCU, the first switch signal to cause the switch circuit to engage and connect the battery power to the transmission circuit.

19. The method of claim 18, further comprising:
responsive to detecting the external power control signal indicating the plug-in of the interface connector to the computing circuit within the pre-set time period, generating, by the test circuit, the external power control signal indicating the physical connection and causing the switch circuit to disengage.

20. The method of claim 14, wherein generating, by the MCU based on the interrupt signal, a first switch control signal to cause the switch circuit to connect the battery power supply to the transmission circuit further comprises:
configuring, by the MCU, the accelerometer to generate the interrupt signal responsive to detecting that a proper acceleration value equals to or exceeds a threshold value; and
responsive to receiving the interrupt signal generated by the accelerometer, generating, by a microcontroller implemented in the MCU, a motion detection signal to cause generating the first switch control signal.

* * * * *